US009409283B2

(12) United States Patent
Wang

(10) Patent No.: US 9,409,283 B2
(45) Date of Patent: Aug. 9, 2016

(54) ANCILLARY FIXTURE FOR ASSEMBLING TOUCH DISPLAY

(71) Applicant: WISTRON CORPORATION, Taipei Hsien (TW)

(72) Inventor: Yun-Jun Wang, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 233 days.

(21) Appl. No.: 14/255,057

(22) Filed: Apr. 17, 2014

(65) Prior Publication Data

US 2015/0121691 A1 May 7, 2015

(30) Foreign Application Priority Data

Nov. 6, 2013 (CN) .......................... 2013 1 0549435

(51) Int. Cl.
*B23P 19/00* (2006.01)
*B25B 11/02* (2006.01)

(52) U.S. Cl.
CPC ........... *B25B 11/02* (2013.01); *Y10T 29/49117* (2015.01); *Y10T 29/53261* (2015.01)

(58) Field of Classification Search
CPC ............. F16M 11/2064; A47B 17/065; G02F 1/133308; G02F 1/1303; Y10T 29/53174; Y10T 29/53261
USPC .............. 29/759, 53, 270, 729, 825; 118/715, 118/719, 733; 414/217, 225.01, 744.1, 939, 414/941
See application file for complete search history.

(56) References Cited

U.S. PATENT DOCUMENTS 7,665,946 B2 * 2/2010 Hur ................... H01L 21/67742 414/217
7,879,181 B2 * 2/2011 Lee ..................... H01L 21/6719 118/719

* cited by examiner

*Primary Examiner* — Thiem Phan
(74) *Attorney, Agent, or Firm* — Rosenberg, Klein & Lee

(57) ABSTRACT

The present disclosure provides an ancillary fixture for assembling a touch display and the method for using the same. The ancillary fixture comprises a first carrying member, a second carrying member, a support structure, a first positioning mechanism, and a second positioning mechanism. The first carrying member and the second carrying member are pivoted at the support structure. The first carrying member has a first carrying surface. The second carrying member has a second carrying surface opposing to the first carrying surface. The first carrying surface and the second carrying surface are used for carrying at least one component of the touch display, respectively. The first positioning mechanism and the second positioning mechanism are used for adjusting the inclination angle of the first carrying member and the second carrying member with respect to the support structure, respectively, to finish assembling the touch display.

17 Claims, 14 Drawing Sheets

ANCILLARY FIXTURE FOR ASSEMBLING TOUCH DISPLAY

FIELD OF THE DISCLOSURE

The present disclosure relates generally to a fixture and the method for using the same, and particularly to an ancillary fixture for assembling a touch display and the method for using the same.

BACKGROUND OF THE DISCLOSURE

As the times become progressive increasingly, electronic device are more convenient for usage. People rely heavily on electronic products such as tablet computers, notebook computers, mobile phones, personal digital assistants, automatic tell machines, handwriting input devices, and other electronic devices having a display. In addition, because touch panels own the advantages of friendly interfaces, they are widely applied to various electronic products having a display. Because the number of portable communication and consumer electronic products in use increases daily, which enhances convenience in lives substantially, and a great number of touch panels are adopted this type of products as their input devices, many manufacturers invested in the technological development related to touch panels in recent years.

Touch panels have been applied extensively to the surfaces of various displays, including liquid crystal displays (LCDs), plasma display panels (PDPs), filed emission displays (FEDs), electroluminescent displays (ELDs), or cathode ray tubes (CRTs), and forming touch displays. Thereby, following the instructions shown on the displays, users can touch the desired locations using objects, for example, his fingers or touch styli, to perform functions such as selecting or inputting.

Current notebook computers adopt normal display devices. The assembly of display devices to notebook computers is done manually. If current display devices are to be substituted by touch displays and assembled manually, because the amount of components in a touch display is more than that in a normal display device, instead of assembling by a single labor, multiple labors are required simultaneously. This will result in a substantial increase in labor cost. Besides, because damages may occur by collisions among components as a result of labors' excessive fatigue during the assembling process, the assembly yield will be reduced.

Accordingly, the present disclosure provides an ancillary fixture for assembling a display panel and the method for using the same. The present disclosure assists the assembling of a touch display, achieves single-labor assembling, and reduces the collisions among the components of the touch display. Hence, the labor cost and hour in assembling are reduced; the assembly yield is also improved.

SUMMARY

An objective of the present disclosure is to provide an ancillary fixture for assembling a display panel and the method for using the same, which can be used for assisting the assembling of a touch display and achieving single-labor assembling, and thus reducing labor cost and waste in labor hour.

Another objective of the present disclosure is to provide an ancillary fixture for assembling a display panel and the method for using the same, which can avoid collisions and damages of a plurality of components in a touch display due to labors' fatigue. Thereby, the assembly yield can be enhanced effectively.

In order to achieve the objectives and effects described above, the present disclosure discloses an ancillary fixture for assembling a touch display, which comprises: a first carrying member, a second carrying member, a support structure, a first positioning mechanism, and a second positioning mechanism. The first carrying member has a first carrying surface, which carries at least one component of a touch display. The second carrying member is located at one end of the first carrying member and has a second carrying surface corresponding to the first carrying surface. The second carrying surface carries at least one component of the touch display. The support structure is used for pivoting the first and second carrying members, which rotate with respect to the support structure. The first positioning mechanism is disposed at the support structure and the first carrying member for fixing the inclination angle of the first carrying member with respect to the support structure. The second positioning mechanism is disposed at the support structure and the second carrying member for fixing the inclination angle of the second carrying member with respect to the support structure.

The present disclosure provides a method for using an ancillary fixture for assembling a touch display, which comprises steps of rotating a second carrying member of an ancillary fixture and fixing the inclination angle of the second carrying member; disposing a bottom lid of a touch display on the second carrying member; disposing a top lid of the touch display on a first carrying member of the ancillary fixture; connecting a first signal line to a display module of the top lid; disposing the top lid on the first carrying member, rotating the first carrying member, and fixing the inclination angle of the first carrying member for enabling the first carrying member to carry the top lid; and connecting a second signal line to the display module for finishing assembling the touch display.

DETAILED DESCRIPTION

In order to make the structure and characteristics as well as the effectiveness of the present disclosure to be further understood and recognized, the detailed description of the present disclosure is provided as follows along with embodiments and accompanying figures.

The assembly of display devices normally is done manually without using any ancillary fixture. Currently, display devices are replaced by touch panels. Compared with normal display devices, touch panels have more components. Thereby, more labors are required for assembling them and it is not possible to complete assembling by a single labor, which will result in a substantial increase in labor cost. Besides, damages may occur by incautious collisions among components as a result of labors' excessive fatigue during the assembling process. For solving the above problems, the present disclosure provides an ancillary fixture for assembling a display panel and the method for using the same. The present disclosure achieves single-labor assembling and thus reducing waste in labor cost. In addition, damages of the touch displays during manual assembling can be further avoided, improving the assembly yield effectively.

Figure 1:
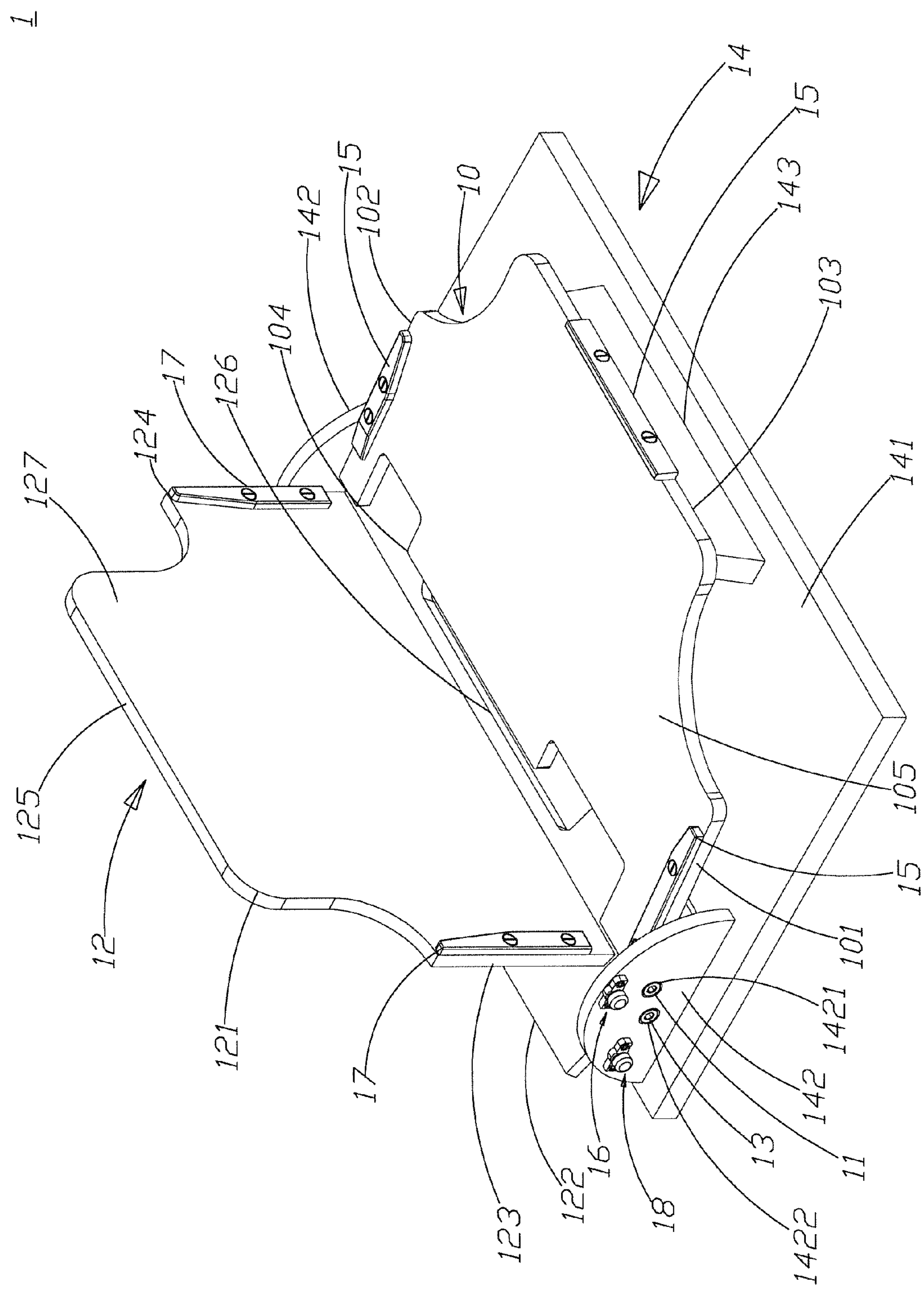
FIG. 1 shows a schematic diagram of the ancillary fixture according the first embodiment of the present disclosure.
Figure 2:
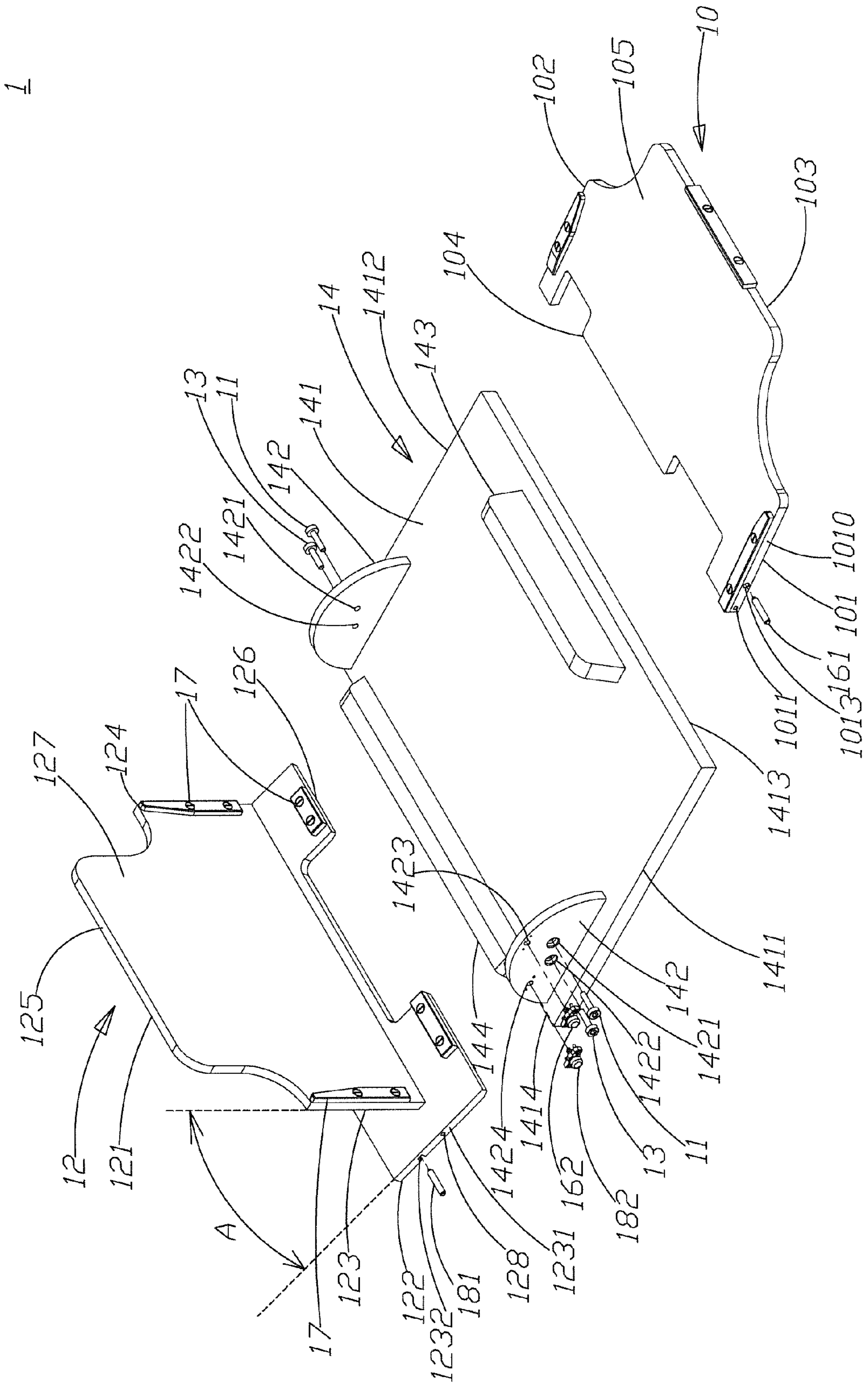
FIG. 2 shows an exploded view of the ancillary fixture according the first embodiment of the present disclosure.
Figure 3:
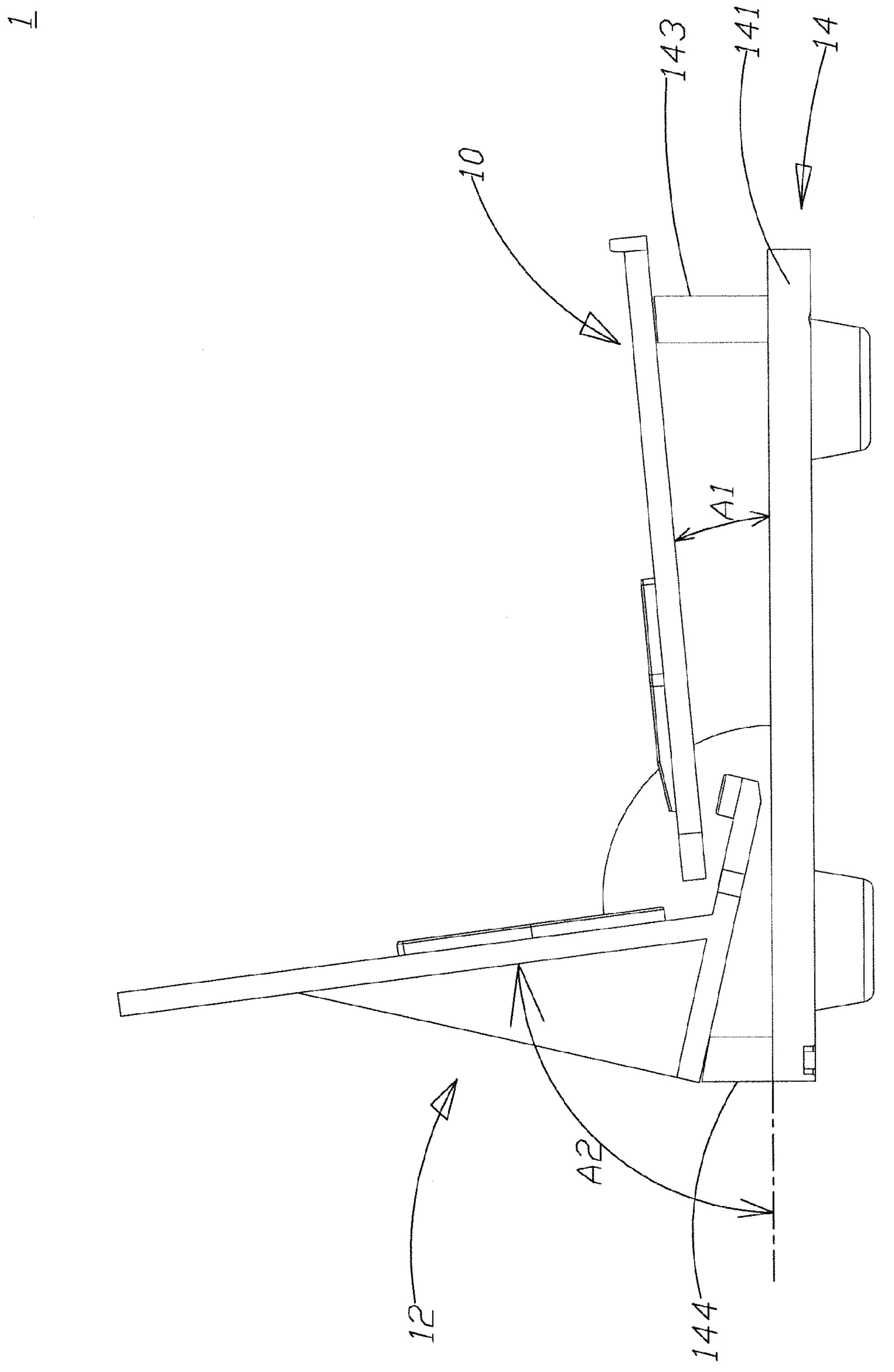
FIG. 3 shows a side view of the ancillary fixture according the first embodiment of the present disclosure.

Please refer to FIGS. 1 to 3, which show a schematic diagram, an exploded view, and a side view of the ancillary fixture according the first embodiment of the present disclosure. As shown in the figure, the present embodiment provides an ancillary fixture 1 for assembling a touch display. The ancillary fixture 1 comprises a first carrying member 10, a second carrying member 12, a support structure 14, a first positioning mechanism 16, and a second positioning mechanism 18. The first carrying member 10 is a plate, comprising a first side 101, a second side 102 opposing to the first side 101, a first end 103, a second end 104 opposing to the first end 103, and a first carrying surface 105. The second carrying member 12 has a first plate 121 and a second plate 122. The first plate 121 is disposed on the second plate 122, and inclining an angle A with respect to the second plate 122. The second carrying member 12 also has a first side 123, a second side 124 opposing to the first side 123, a first end 125, a second end 126 opposing to the first end 125, and a second carrying surface 127. Besides, the second plate 122 is located at the second end 126 of the first carrying member 12.

The first and second carrying members 10, 12 are pivoted at the support structure 14. The second end 126 of the second carrying member 12 is located at the second end 104 of the first carrying member 10; the first carrying surface 105 of the first carrying member 10 corresponds to the second carrying surface 127 of the second carrying member 12. The support structure 14 has a support base 141, two pivot boards 142, a first support board 143, and a second support board 144. The support base 141 has a first side 1411, a second side 1412 opposing to the first side 1411, a first end 1413, and a second end 1414 opposing to the first end 1413. The two pivot boards 142 are disposed on the first side 1411 and the second side 1412 of the support base 141, respectively. The first support board 143 is disposed at the first end 1413 of the support base 141; the second support board 144 is disposed at the second end 1414 of the support base 141.

The two pivot boards 142 have a first pivot hole 1421 and a second pivot hole 1422, respectively. Each first pivot hole 1421 and each second pivot hole 1422 penetrate the corresponding pivot board 142. The tow first pivot holes 1421 and the two second pivot holes 1422 correspond to each other, respectively. When the first carrying member 10 is assembled to the support structure 14, the first side 101 and the second side 102 of the first carrying member 10 correspond to the two pivot boards 142, respectively, and the first carrying surface 105 is away from the support base 141. The first side 101 of the first carrying member 10 has a first positioning hole 1011 on a first side surface 1010 corresponding to the pivot board 142; the first positioning hole 1011 located on the first side surface 1010 corresponds to the first pivot hole 1421 of the nearby pivot board 142. Likewise, the second side 102 of the first carrying member 10 also has a first positioning hole 1011 on a second side surface corresponding to the other pivot board 142; the first positioning hole 1011 located on the second side surface corresponds to the first pivot hole 1421 of the nearby pivot board 142. Then, by passing two first rotating shafts 11 through the two first positioning holes 1011 located on the first side surface 1010 and the second side surface 1012 from the two first pivot holes 1421 of the two pivot boards 142, respectively, the first carrying member 10 is pivoted at the two pivot boards 142 and rotatable with respect to the support base 141. When the first carrying member 10 does not rotate, it is placed on the first support board 143, which supports the first carrying member 10 and tilts the first carrying member 10 by a first angle A1 with respect to the support base 141. At this moment, the position of the first carrying member 10 is set as the initial position.

Similarly, when the second carrying member 12 is assembled to the support structure 14, a second positioning hole 128 is located on a first side surface 1231 and a second side surface opposing to the first side surface 1231 of the second carrying member 12 and corresponding to the two pivot boards 142, respectively. The two second positioning holes 128 correspond to the second pivot holes 1422 of the nearby pivot boards 142, respectively. Normally, by passing two second rotating shafts 13 through the corresponding second pivot holes 1421 and second positioning holes 128, respectively, the second carrying member 12 is pivoted at the two pivot boards 142 and rotatable with respect to the support base 141. When the second carrying member 12 does not rotate, it is placed on the second support board 144, which supports the second carrying member 12 and tilts the second carrying member 12 by a second angle A2 with respect to the support base 141. At this moment, the position of the second carrying member 12 is set as the initial position.

Figure 4:
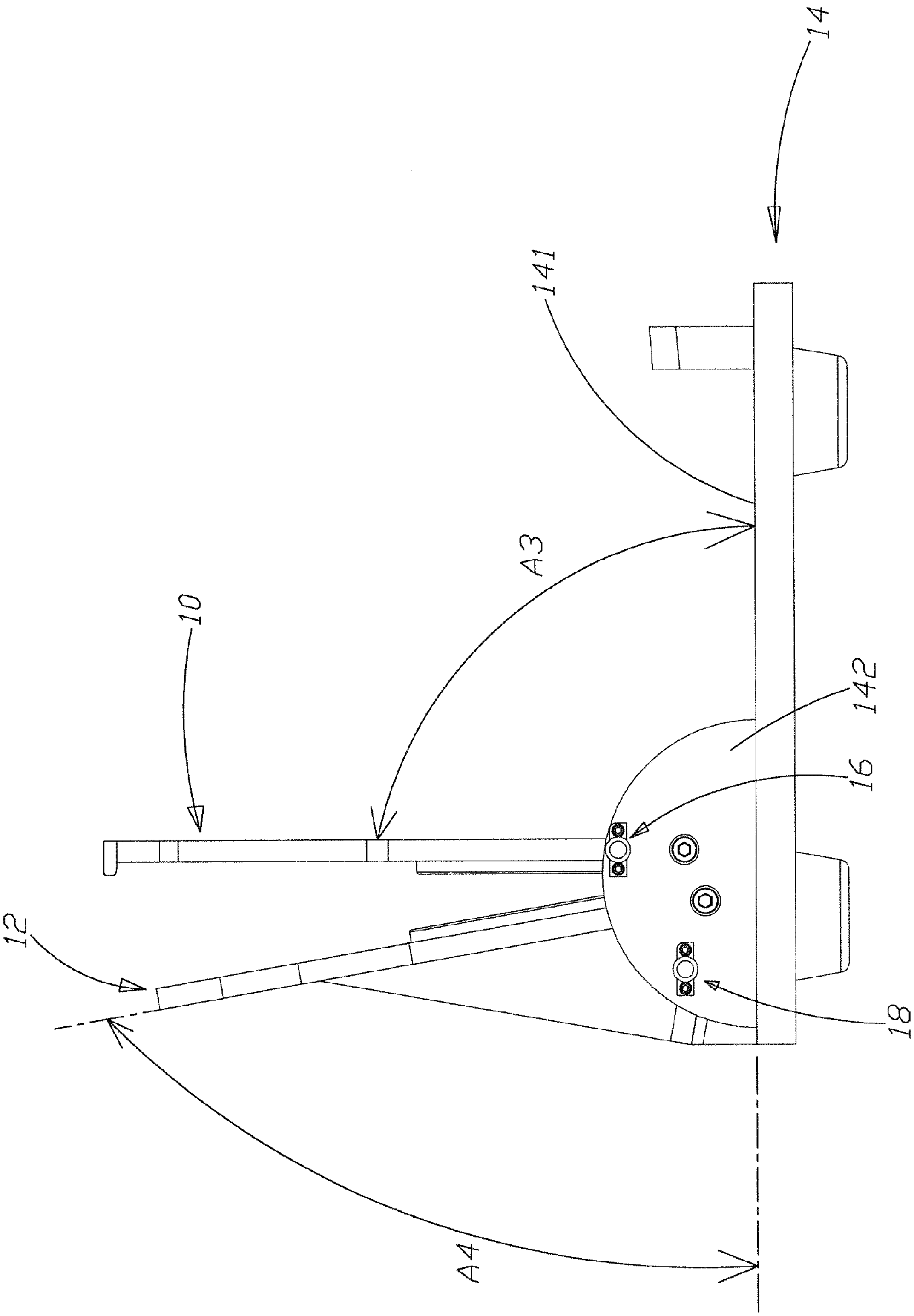
FIG. 4 shows a usage status diagram of the ancillary fixture according the first embodiment of the present disclosure.

Please refer to FIG. 4, which shows a usage status diagram of the ancillary fixture according the first embodiment of the present disclosure. The first positioning mechanism 16 is disposed at one of the two pivot boards 142 and at the first carrying member 10, and used for fixing a third angle A3 of the first carrying member 10 with respect to the support base 141. The first positioning mechanism 16 comprises a first movable bolt 161 and a first push member 162. The first movable bolt 161 inserts into a first trench 1013 on the first side surface 1010 of the first carrying member 10 and is movable in the first trench 1013. Besides, one end of the first movable bolt 161 projects slightly from the first side surface 1010.

Figure 5A:
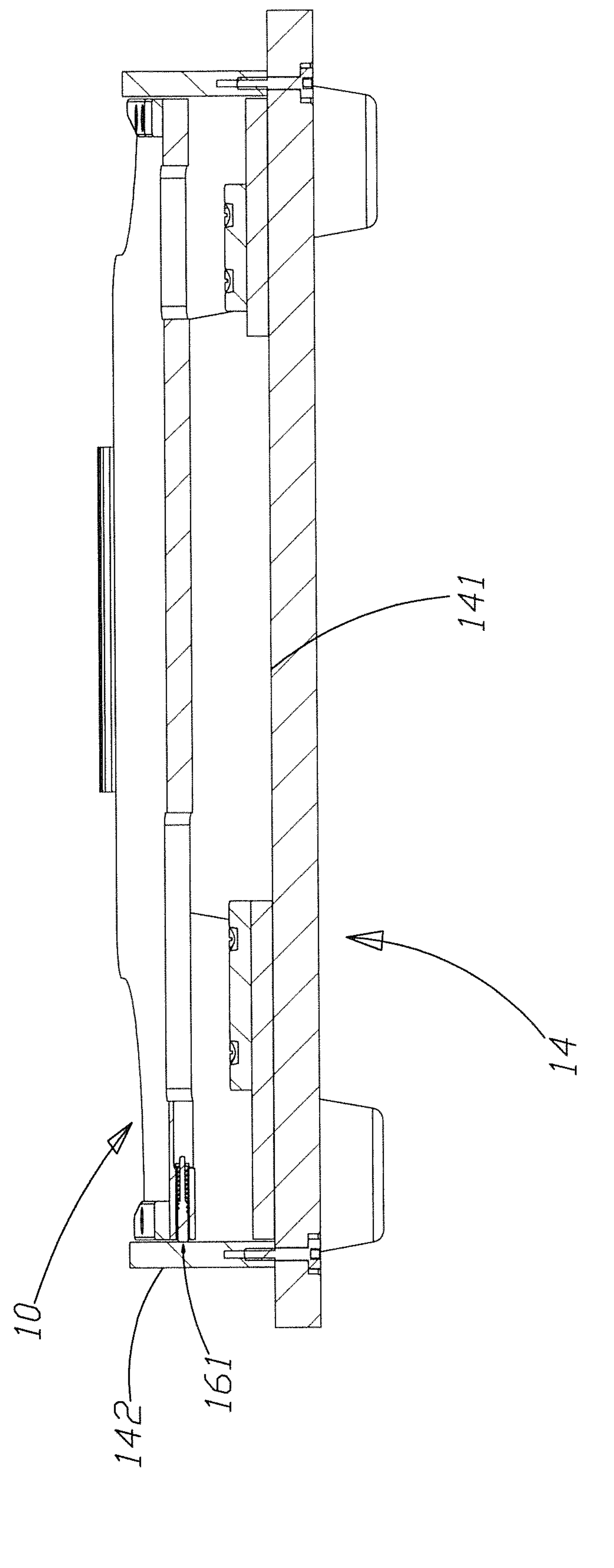
FIGS. 5A to 5C show usage status diagrams of the first positioning mechanism of the ancillary fixture according the first embodiment of the present disclosure.
Figure 5B:
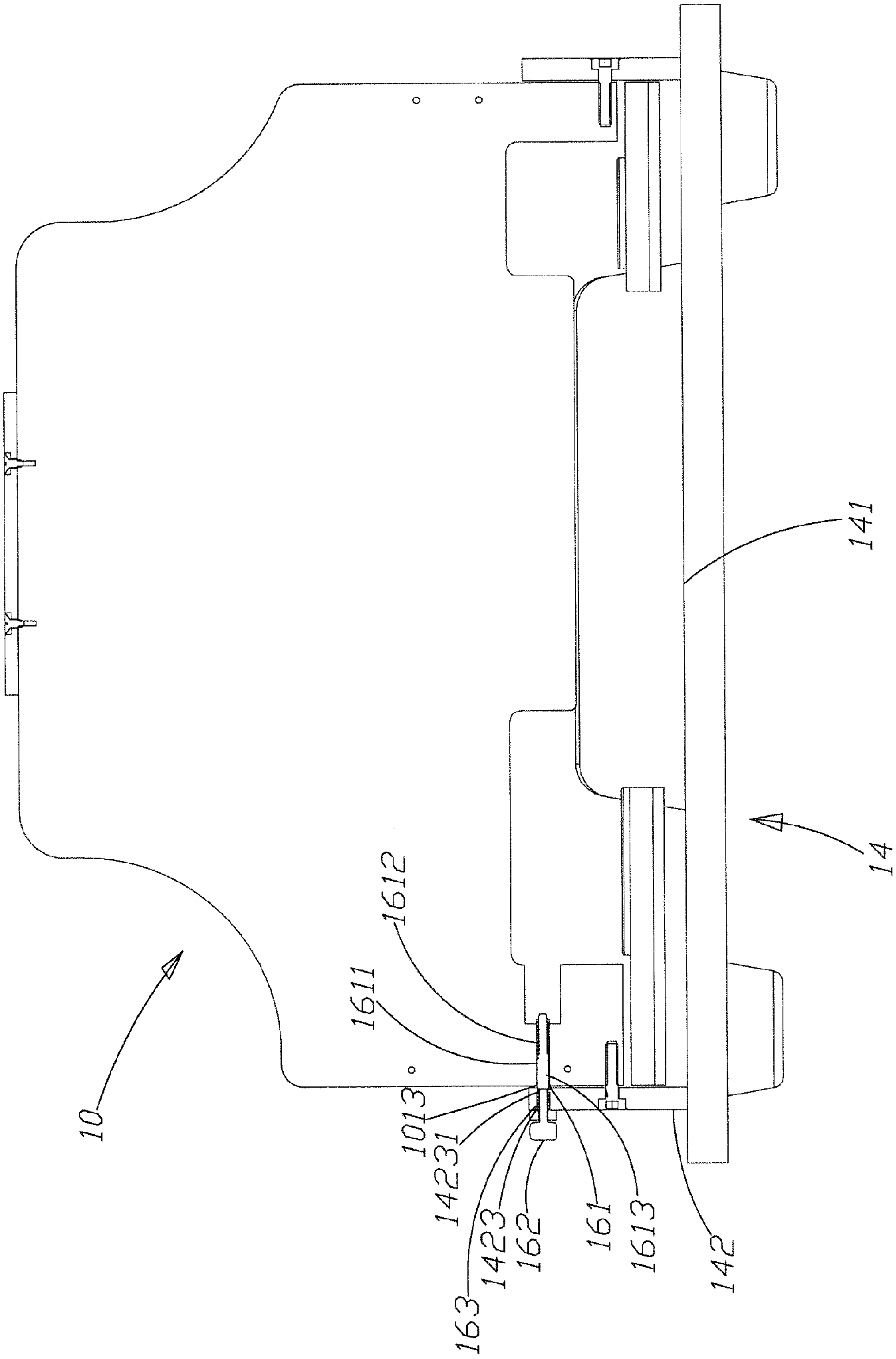
Figure 5C:
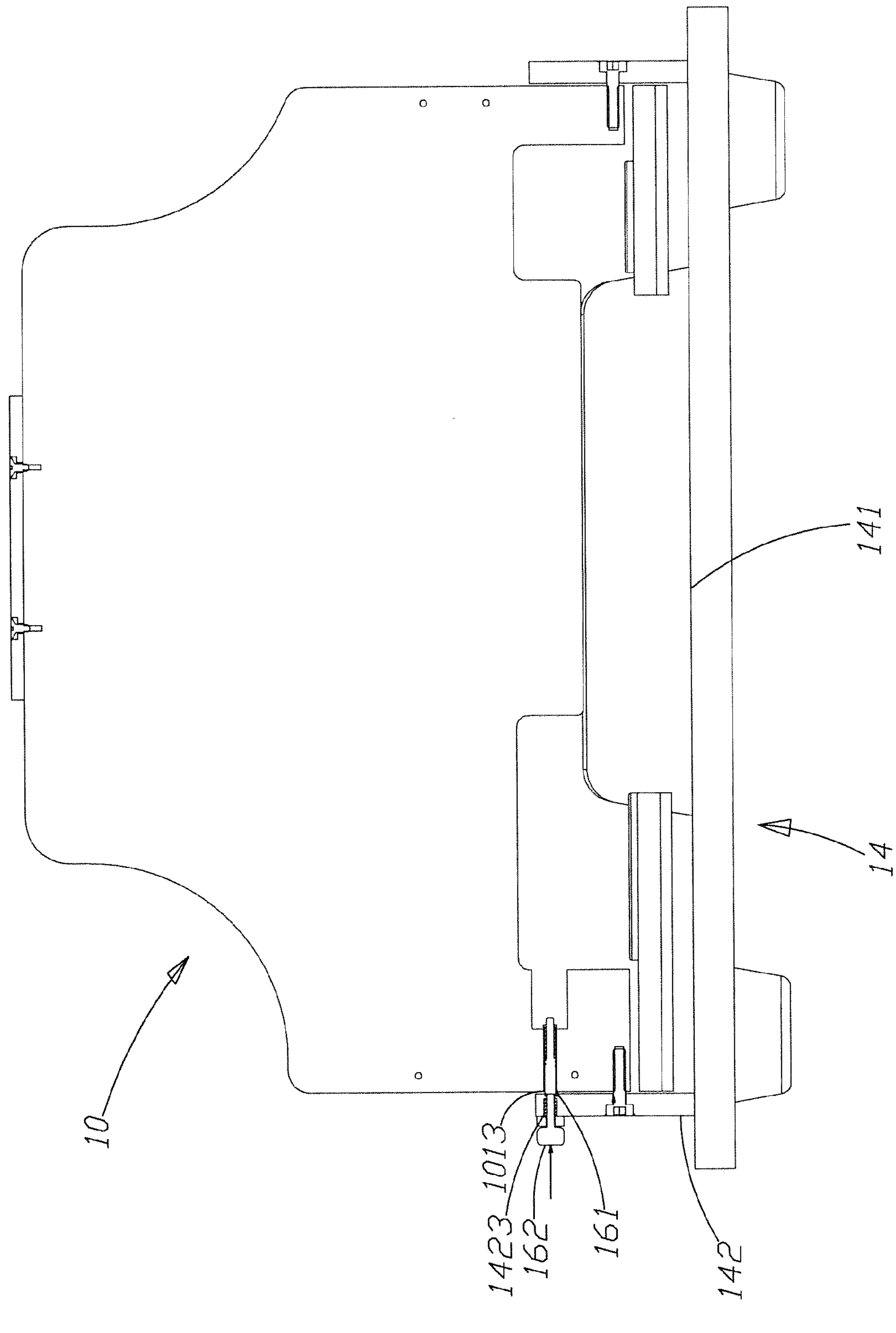

Please refer to FIGS. 5A to 5C, which show usage status diagrams of the first positioning mechanism of the ancillary fixture according the first embodiment of the present disclosure. As shown in the figures, when the first carrying member 10 is pivoted at the two pivot boards 142, the pivot board 142 adjacent to the first side surface 1010 of the first carrying member 10 presses the first movable bolt 161 to enter the first trench 1013 and the first movable bolt 161 continues to be against the pivot board 142. As the first carrying member 10 rotates with respect to the support base 141 to a first hole 1423 of the pivot board 142 adjacent to the first side surface 1010 of the first carrying member 10, the first movable bolt 161 departs from the press of the pivot board 142 and is wedged in the first hole 1423 for fixing the third angle A3 of the first carrying member 10 with respect to the support base 141. When the first carrying member 10 is to recover to the initial position, the first push member 162 inserts into the first hole 1423 of the pivot board 142 and moves towards the first trench 1013 for departing from the first hole 1423, which enables the first carrying member 10 to rotate with respect to the support base 141 and recover to the initial position. Namely, the first carrying member 10 is placed on the first support board 143, as shown in FIG. 3.

Please refer again to FIG. 4. Likewise, fixing a fourth angle A4 of the second carrying member 12 with respect to the support base 141 is done by the second positioning mechanism 18 disposed at the second carrying member 12 and the pivot board 142. The second positioning mechanism 18 also comprises a second movable bolt 181 and a second push member 182. The second movable bolt 181 and the first positioning mechanism 16 according to the present embodiment are disposed at the same pivot board 142. Thereby, the second movable bolt 181 inserts into a second trench 1232 on the first side surface 1231 of the second carrying member 12 and projects slightly from the first side surface 1231.

Figure 6:
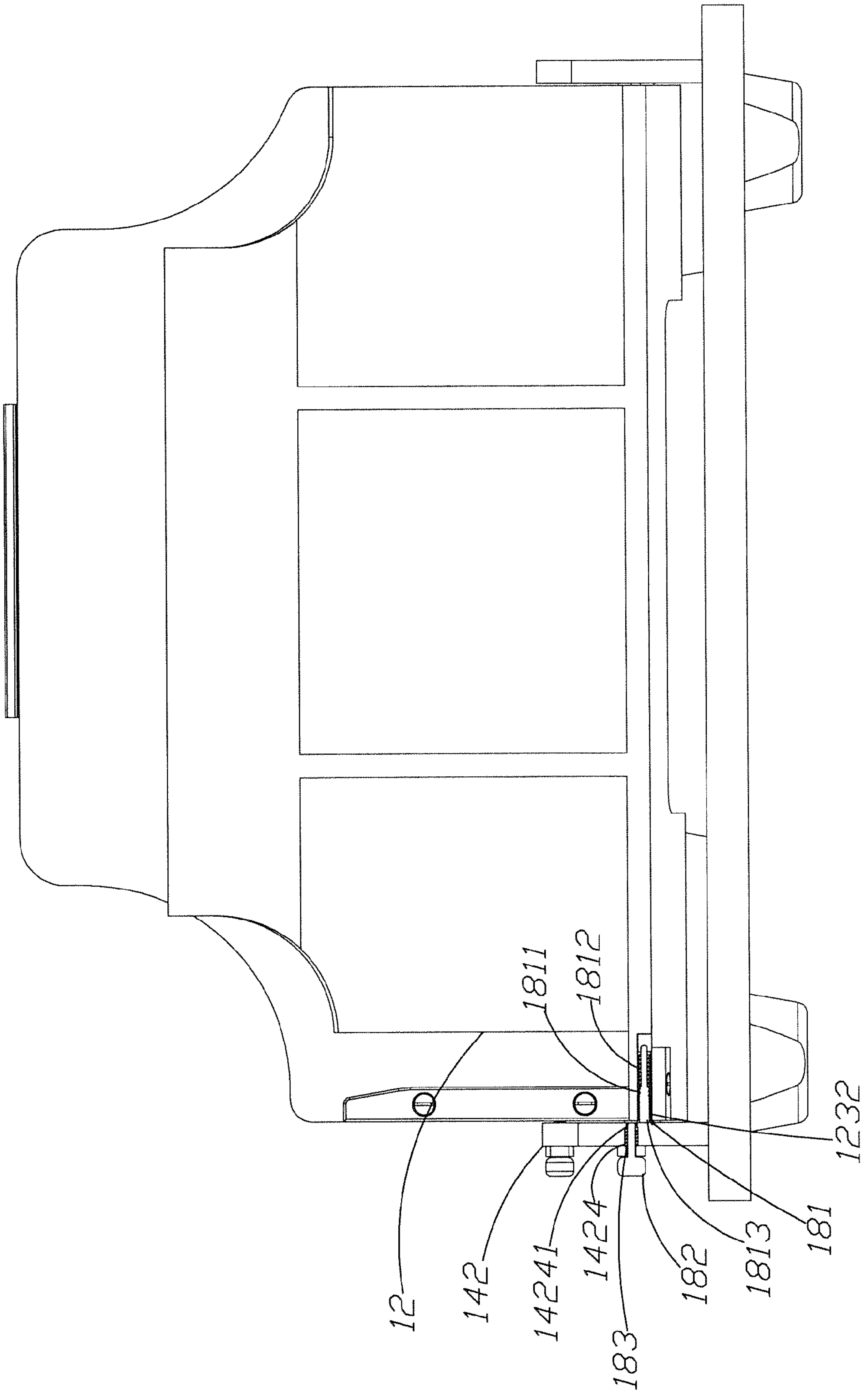
FIG. 6 shows a usage status diagram of the second positioning mechanism of the ancillary fixture according the first embodiment of the present disclosure.
Figure 7:
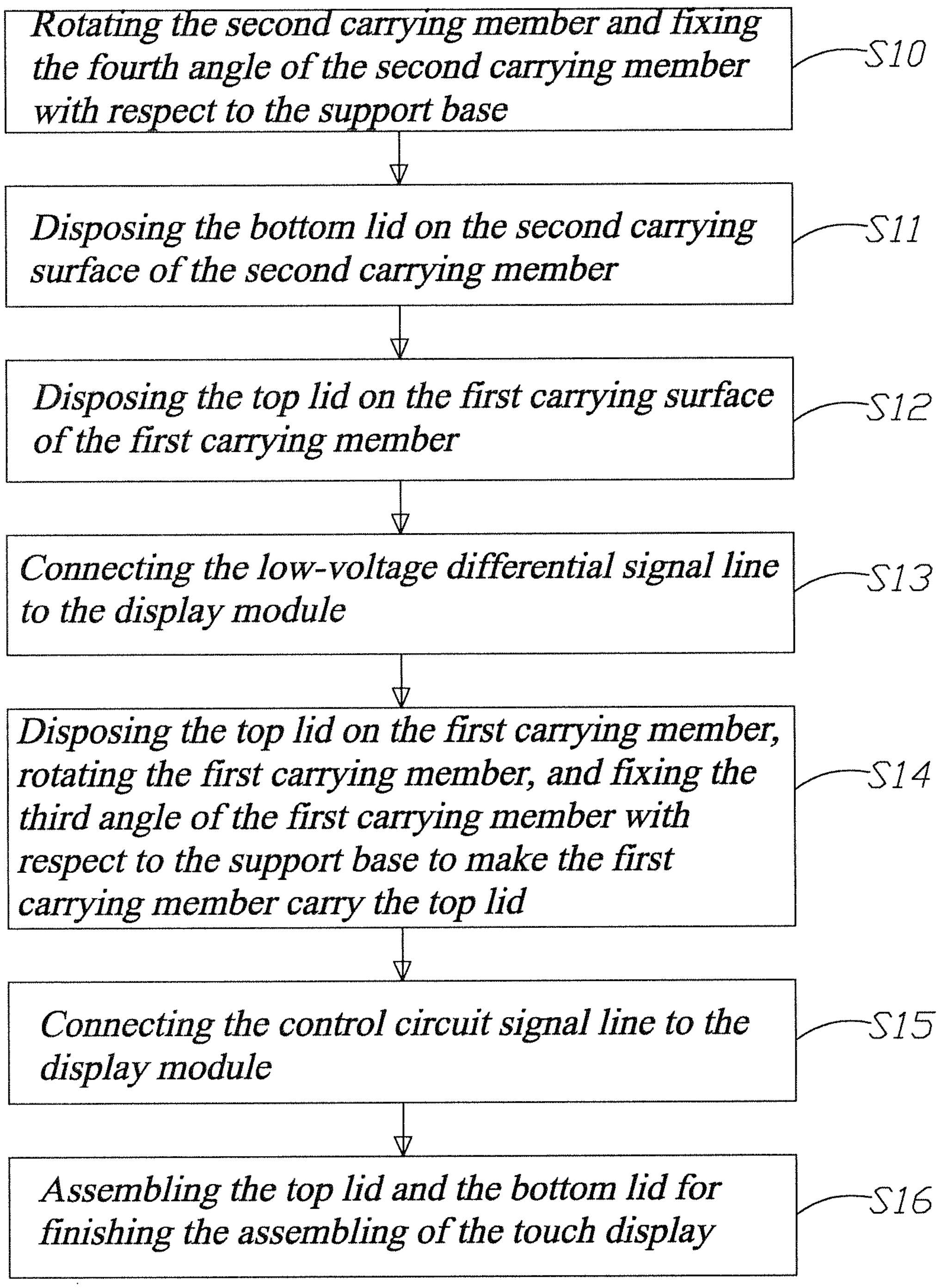
FIG. 7 shows a flowchart of assembling a touch display using the ancillary fixture according the first embodiment of the present disclosure.
Figure 8A:
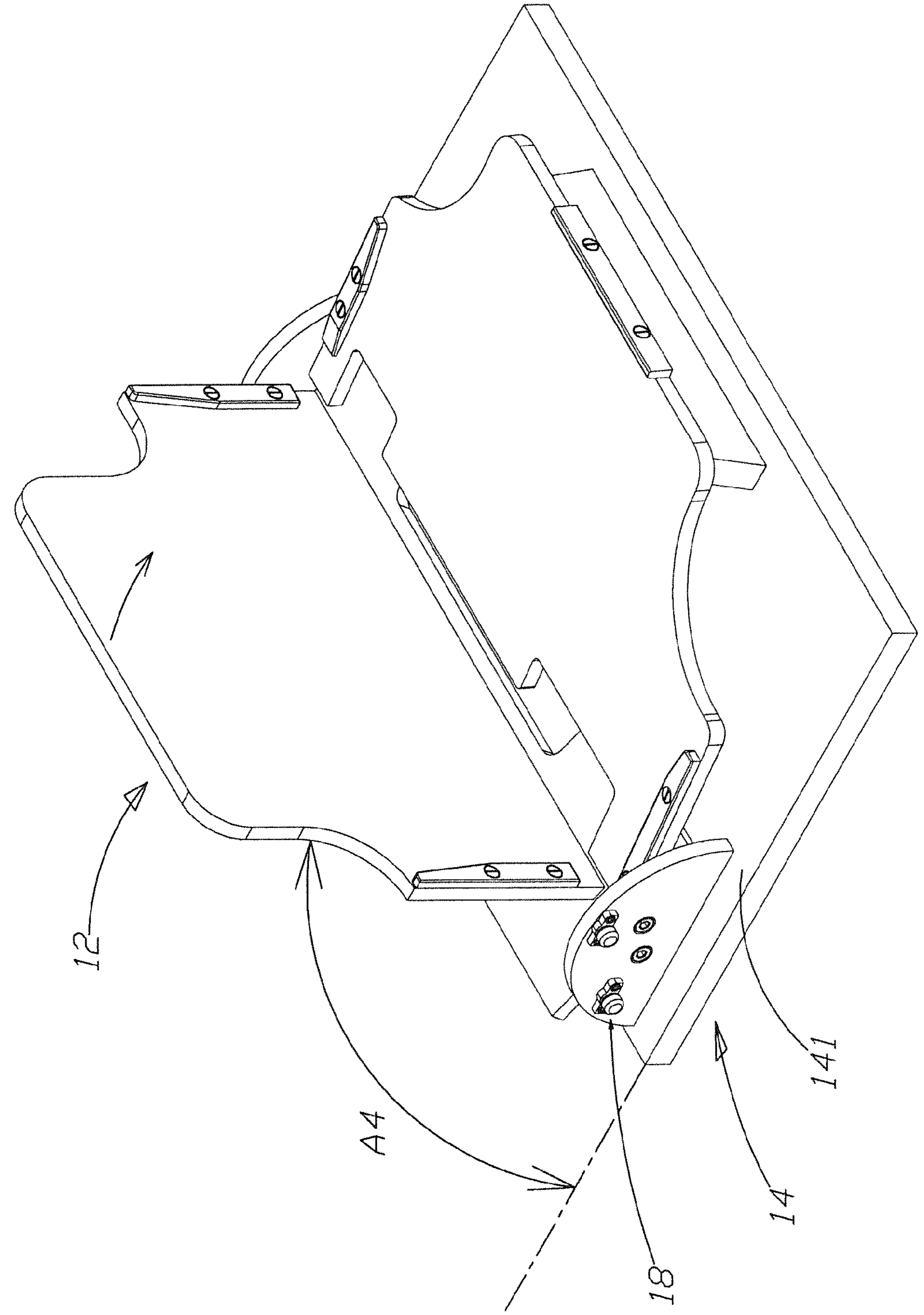
FIGS. 8A to 8E show usage status diagrams of assembling a touch display using the ancillary fixture according the first embodiment of the present disclosure.
Figure 8B:
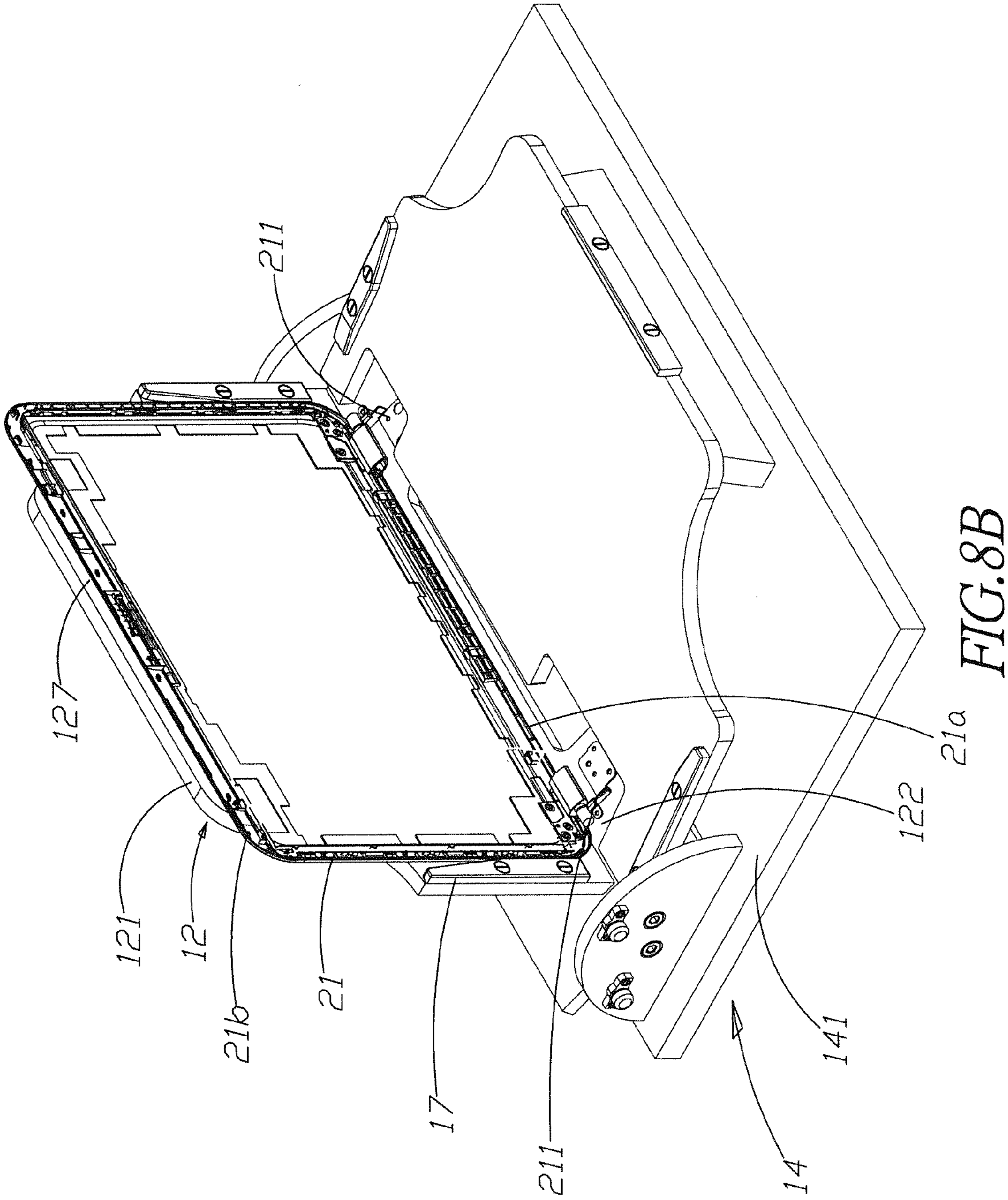
Figure 8C:
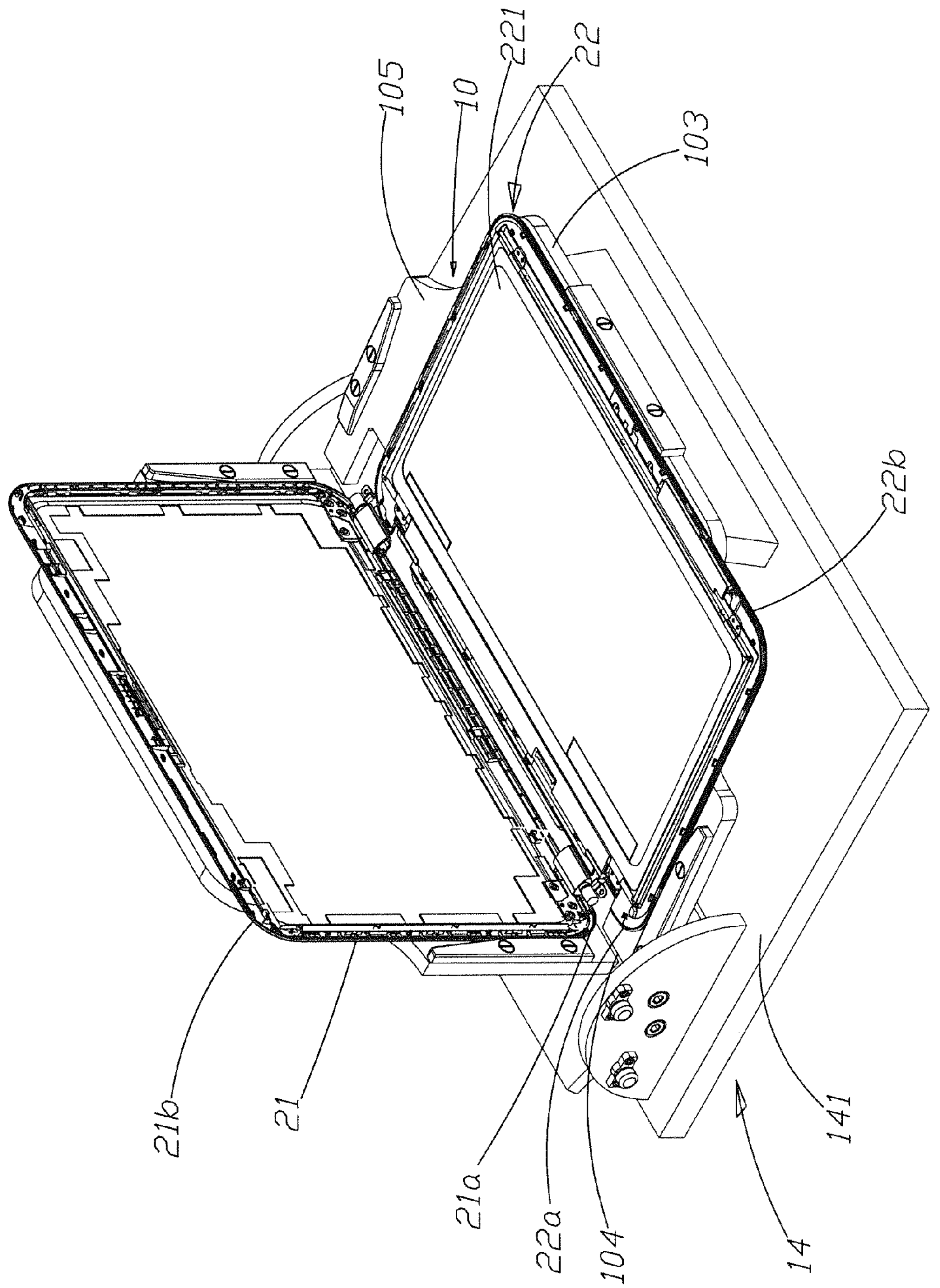
Figure 8D:
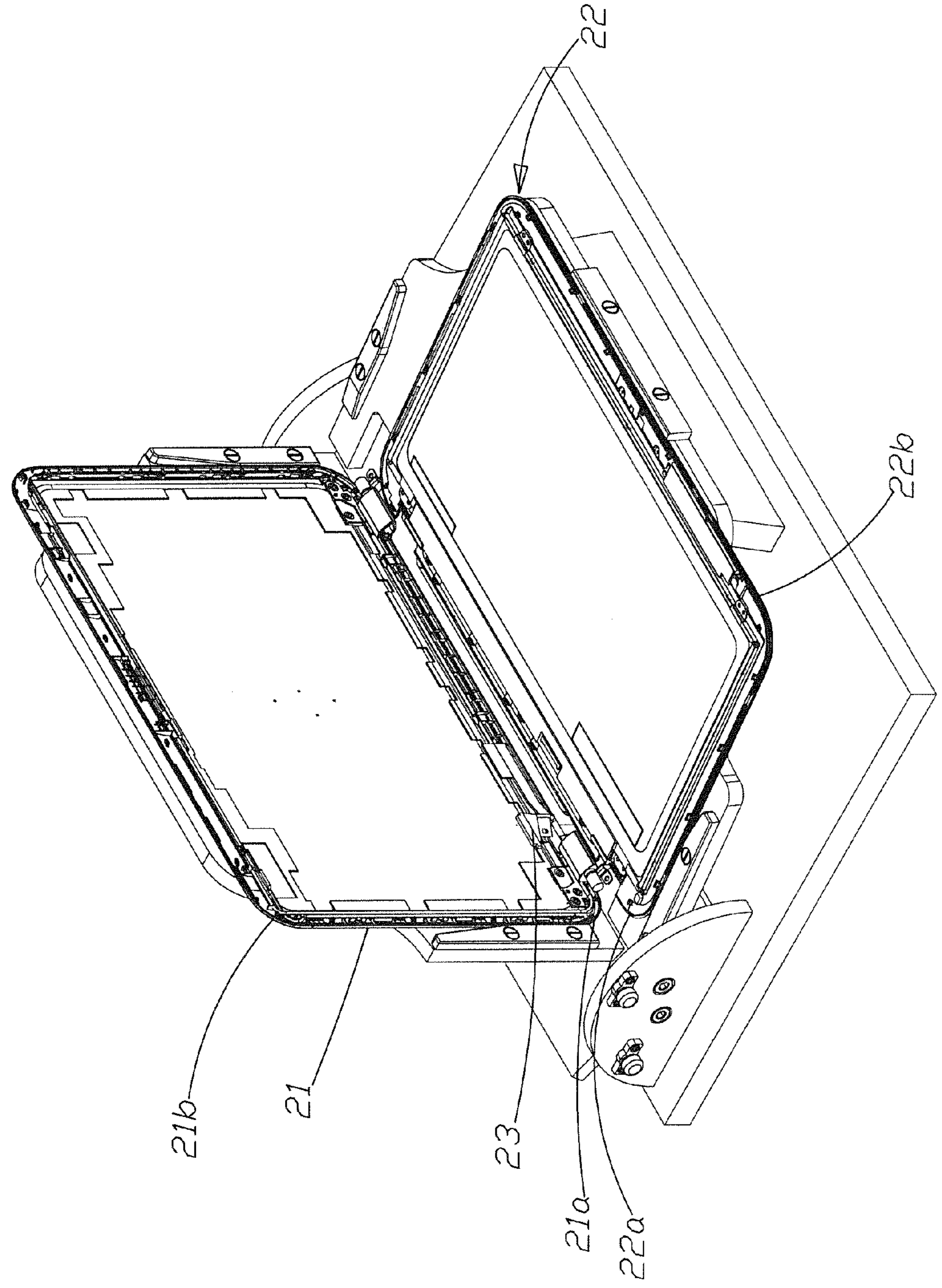
Figure 8E:
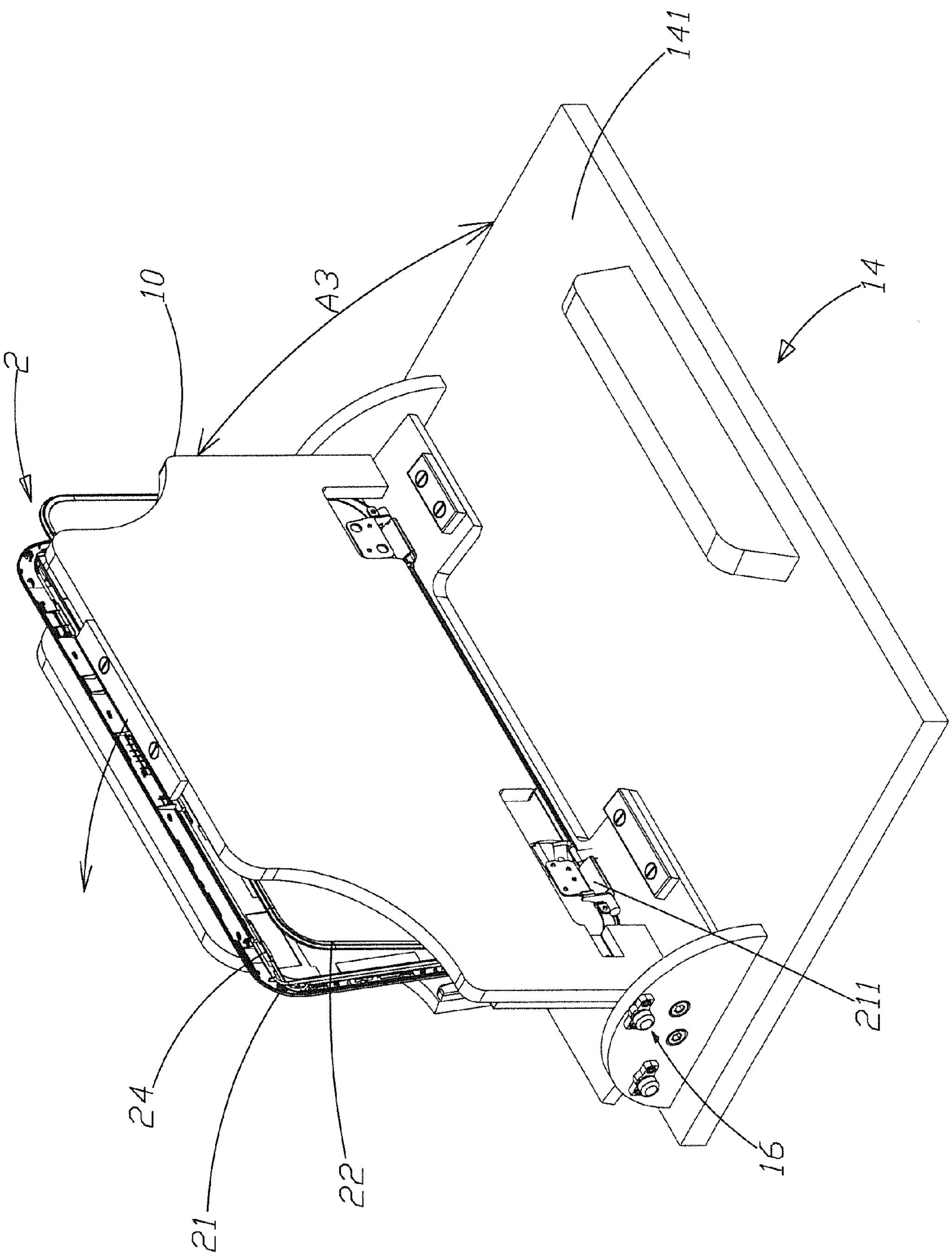

Please refer to FIG. 6, which shows a usage status diagram of the second positioning mechanism of the ancillary fixture according the first embodiment of the present disclosure. As shown in the figure, when the second carrying member 12 is pivoted at the two pivot boards 142, the pivot board 142 presses the second movable bolt 181 to move towards the second trench 1232. In addition, the second movable bolt 181 is against the pivot board 142. The second push member 182 passes through a second hole 1424 of the pivot board 142 for pushing the second movable bolt 181 to move inside the first trench 1232. The operation of the second positioning mechanism 18 is the same as that of the first positioning mechanism 16. Hence, the details will not be described again.

Please refer again to FIG. 5B and FIG. 6. The first movable bolt 161 of the first positioning mechanism 16 according to the present embodiment comprises a first sheath 1611, a first elastic member 1612, and a first pin 1613. The first sheath 1611 is disposed in the first trench 1013; the first elastic member 1612 is disposed in the first sheath 1611; the First pin 1613 inserts to the first elastic member 1612; the first elastic member 1612 is located between the first sheath 1611 and the first pin 1613. The first elastic member 1612 uses its elasticity to support the first pin 1613, so that the first pin 1613 can be against the pivot board 142 or wedged in the first hole 1423. The structure of the second movable pin 181 of the second positioning mechanism 18 according to the present embodiment is identical to that of the first movable pin 161. The second movable pin 181 comprises a second sheath 1811, a second elastic member 1812, and a second pin 1813. The second sheath 1811 is disposed in the second trench 1232; the second pin 1813 passes through the second sheath 1811. The second elastic member 1812 is disposed between the second sheath 1811 and the second pin 1813 for supporting the second pin 1813 to be against the pivot board 142 or wedged in the second hole 1423. Besides, the first hole 1423 and the second hole 1424 have a projective part 14231, 14241, respectively. A third elastic member 163 is disposed between the first push member 162 and the projective part 14231 of the first hole 1423. The elasticity of the third elastic member 163 supports the first push member 162 in the first hole 1423. Likewise, a fourth elastic member 183 is disposed between the second push member 182 and the projective part 14241 of the second hole 1424. The elasticity of the fourth elastic member 183 supports the second push member 182 in the second hole 1424. As the first push member 162 is pressed and pushes the first pin 1613, the third elastic member 163 is compressed. When the pressing of the first pushed member 162 is stopped, the third elastic member 163 recovers to the original status. Meanwhile, the first push member 162 is driven away from the first pin 1613 by using the elasticity of the third elastic member 163. The operations of the second push member 182 and the fourth elastic member are the same as those of the first push member 162 and the third elastic member 1612. Hence, the details will not be described again.

Please refer to FIG. 1 and FIG. 2 again. The ancillary fixture 1 according to the present embodiment comprises a plurality of first limiters 15 and a plurality of second limiters 17. The plurality of first limiters 15 are disposed on the first side 101, the second side 102, and at the first end 103 of the first carrying member 10, respectively. That is to say, the plurality of first limiters 15 are disposed on the edges of the first carrying member 10. When a component is placed on the first carrying member 10, the first limiter 15 can limit the location for placing the component and avoid shifting of the component. Similarly, the plurality of second limiters 17 are disposed on the second carrying surface 127 of the second carrying member 12, and located on the first side 123, the second side 124, and at the second end 126 of the second carrying member 12, respectively. Namely, the plurality of second limiters 17 are disposed on the edges of the second carrying member 12. The second limiter 15 is also used for limiting the location of the component on the second carrying surface 127 and thus avoiding shifting.

In the above, the structure of the ancillary fixture 1 according to the present disclosure has been described. In what follows, the method of using the ancillary fixture 1 for assembling a touch display 2 will be described. Please refer to FIG. 7 and FIGS. 8A to 8E, which show a flowchart and usage status diagrams of assembling a touch display using the ancillary fixture according the first embodiment of the present disclosure. As shown in the figures, the touch display 2 has a plurality of components, which comprise a bottom lid 21 having at least one pivot shaft 211, a top lid 22 having a display module 221, a low-voltage differential signal line 23 (the first signal line), a control circuit signal line 24 (a second signal line). When the touch display 2 is being assembled, the step S10 is first executed for rotating the second carrying member 12 and tilting the second carrying member 12 by the fourth angle A4 with respect to the support base 141. Then, the step S11 is executed for disposing the bottom lid 21 on the second carrying surface 127 of the second carrying member 12. The bottom lid 21 has a first end 21*a* and a second end 21*b*. The first end 21*a* of the bottom lid 21 is close to the second plate 122 of the second carrying member 12; the second end 21*b* of the bottom lid 21 is close to the first plate 121 of the second carrying member 12. The pivot shaft 211 is located on the first end 21*a* of the bottom lid 21 and disposed on the second plate 122 of the second carrying member 12.

Next, the step S12 is executed for disposing the top lid 22 on the first carrying surface 105 of the first carrying member 10. The top lid 22 has a first end 22*a* and a second end 22*b*. The first end 22*a* of the top lid 22 is close to the second end 104 of the first carrying member 10; the second end 22*b* of the top lid 22 is close to the first end 103 of the first carrying member 10; and the first end 22*a* of the top lid 22 corresponds to the first end 21*a* of the bottom lid 21. Then the step S13 is executed for connecting the low-voltage differential signal line 23 to the display module 221.

Afterwards, the step S14 is executed for disposing the top lid 22 on the first carrying member 10, rotating the first carrying member 10, and tilting the first carrying member 10 by the third angle A3 with respect to the support base 141. At this time, the first positioning mechanism 16 fixes the third angle A3 of the first carrying member 10 with respect to the support base 141, making the first carrying member 10 carry the top lid 22. Then, the step S15 is executed for connecting the control circuit signal line 24 to the display module 221.

Finally, the step S16 is executed for assembling the top lid 22 and the bottom lid 21. Thereby, the assembling of the touch display 2 is completed.

To sum up, the present disclosure provides an ancillary fixture for assembling a touch display and the method for using the same. The present disclosure assists assembling of a touch display and enables assembling of a touch display to be done by a single person. Thereby, the labor and labor hour invested for assembling a touch display can be reduced effectively. In addition, collisions and damages of touch displays during the assembling process caused by labors' fatigue can be avoided, which increases the assembly yield effectively.

Accordingly, the present disclosure conforms to the legal requirements owing to its novelty, nonobviousness, and utility. However, the foregoing description is only embodiments of the present disclosure, not used to limit the scope and range of the present disclosure. Those equivalent changes or modifications made according to the shape, structure, feature, or spirit described in the claims of the present disclosure are included in the appended claims of the present disclosure.

The invention claimed is:

1. An ancillary fixture for assembling a touch display, comprising:
   - a first carrying member having a first carrying surface, carrying at least one component of a touch display;
   - a second carrying member located at one end of said first carrying member, having a second carrying surface corresponding to said first carrying surface, said second carrying surface carrying at least one component of said touch display;
   - a support structure pivoting said first carrying member and said second carrying member, and said first carrying member and said second carrying member rotating with respect to said support structure;
   - a first positioning mechanism disposed at said support structure and said first carrying member for fixing the inclination angle of said first carrying member with respect to said support structure; and
   - a second positioning mechanism disposed at said support structure and said second carrying member for fixing the inclination angle of said second carrying member with respect to said support structure.

2. The ancillary fixture for assembling a touch display of claim 1, wherein said support structure comprises:
   - a support base;
   - two pivot boards disposed in both sides of said support base, respectively, and said first carrying member and said second carrying member pivoted at said pivot boards, respectively;
   - a first support board disposed at a first end of said support base, and supporting said first carrying member; and
   - a second support board disposed at a second end of said support base, and supporting said second carrying member.

3. The ancillary fixture for assembling a touch display of claim 2, wherein said first positioning mechanism comprises:
   - a first movable bolt disposed in a first trench of said side surface of said first carrying member; and
   - a first push member disposed in a first hole of said pivot board, said first movable bolt wedged in said first hole of said pivot board when said first carrying member rotates with respect to said support structure for fixing the inclination angle of said first carrying member with respect to said support structure. said first push member pushing said First movable bolt by pressing said first push member for moving said first movable bolt into said first trench, departing from said first hole, and recovering said first carrying member to the initial position.

4. The ancillary fixture for assembling a touch display of claim 3, wherein said first movable bolt comprises:
   - a first sheath disposed in said first trench;
   - a first elastic member disposed in said first sheath; and
   - a first pin passing through said first elastic member located between said first sheath and said first pin for supporting said first pin.

5. The ancillary fixture for assembling a touch display of claim 2, wherein said second positioning mechanism comprises:
   - a second movable bolt disposed in a second trench of said side surface of said second carrying member; and
   - a second push member disposed in a second hole of said pivot board, said second movable bolt wedged in said second hole of said pivot board when said second carrying member rotates with respect to said support structure for fixing the inclination angle of said second carrying member with respect to said support structure, said second push member pushing said second movable bolt by pressing said second push member for moving said second movable bolt into said second trench, departing from said second hole, and recovering said second carrying member to the initial position.

6. The ancillary fixture for assembling a touch display of claim 5, wherein said second movable bolt comprises:
   - a second sheath disposed in said second trench;
   - a second elastic member disposed in said second sheath; and
   - a second pin passing through said second elastic member located between said second sheath and said second pin for supporting said second pin.

7. The ancillary fixture for assembling a touch display of claim 2, wherein said two pivot boards have a first pivot hole, respectively; said first carrying member has a first positioning hole on both side surfaces, respectively; said two positioning holes correspond to said two first pivot holes, respectively; two first rotating shafts penetrate said corresponding first pivot hole and said first positioning hole, respectively; and said first carrying member is pivoted at said two pivot boards and rotates with respect to said support base.

8. The ancillary fixture for assembling a touch display of claim 7, wherein said two pivot boards have a second pivot hole, respectively; said second carrying member has a second positioning hole on both side surfaces, respectively; said two positioning holes correspond to said two second pivot holes, respectively; two second rotating shafts penetrate said corresponding second pivot hole and said second positioning hole, respectively; and said second carrying member is pivoted at said two pivot boards and rotates with respect to said support base.

9. The ancillary fixture for assembling a touch display of claim 8, wherein said first positioning mechanism comprises:
   - a first movable bolt disposed in a first trench of said side surface of said first carrying member; and
   - a first push member disposed in a first hole of said pivot board, said first movable bolt wedged in said first hole of said pivot board when said first carrying member rotates with respect to said support structure for fixing the inclination angle of said first carrying member with respect to said support structure, said first push member pushing said first movable bolt by pressing said first push member for moving said first movable bolt into said first trench, departing from said first hole, and recovering said first carrying member to the initial position.

10. The ancillary fixture for assembling a touch display of claim 9, wherein said first movable bolt comprises:

a first sheath disposed in said first trench;

a first elastic member disposed in said first sheath; and a first pin passing through said first elastic member located between said first sheath and said first pin for supporting said first pin.

11. The ancillary fixture for assembling a touch display of claim 8, wherein said second positioning mechanism comprises:

a second movable bolt disposed in a second trench of said side surface of said second carrying member; and a second push member disposed in a second hole of said pivot board, said second movable bolt wedged in said second hole of said pivot board when said second carrying member rotates with respect to said support structure for fixing the inclination angle of said second carrying member with respect to said support structure, said second push member pushing said second movable bolt by pressing said second push member for moving said second movable bolt into said second trench, departing from said second hole, and recovering said second carrying member to the initial position.

12. The ancillary fixture for assembling a touch display of claim 11, wherein said second movable bolt comprises:

a second sheath disposed in said second trench;

a second elastic member disposed in said second sheath; and a second pin passing through said second elastic member located between said second sheath and said second pin for supporting said second pin.

13. The ancillary fixture for assembling a touch display of claim 1, and further comprising:

at least one first limiter disposed on the edges of said first carrying surface of said first carrying member for limiting said component disposed on said first carrying surface; and at least one second limiter disposed on the edges of said second carrying surface of said second carrying member for limiting said component disposed on said second carrying surface.

14. The ancillary fixture for assembling a touch display of claim 1, wherein said first positioning mechanism comprises:

a first movable bolt disposed in a first trench of said side surface of said first carrying member; and a first push member disposed in a first hole of said support structure, said first movable bolt wedged in said first hole of said pivot board when said first carrying member rotates with respect to said support structure for fixing the inclination angle of said first carrying member with respect to said support structure, said first push member pushing said first movable bolt by pressing said first push member for moving said first movable bolt into said first trench, departing from said first hole, and recovering said first carrying member to the initial position.

15. The ancillary fixture for assembling a touch display of claim 14, wherein said first movable bolt comprises:

a first sheath disposed in said first trench;

a first elastic member disposed in said first sheath; and a first pin passing through said first elastic member located between said first sheath and said first pin for supporting said first pin.

16. The ancillary fixture for assembling a touch display of claim 1, wherein said second positioning mechanism comprises:

a second movable bolt disposed in a second trench of said side surface of said second carrying member; and a second push member disposed in a second hole of said support structure, said second movable bolt wedged in said second hole of said pivot board when said second carrying member rotates with respect to said support structure for fixing the inclination angle of said second carrying member with respect to said support structure, said second push member pushing said second movable bolt by pressing said second push member for moving said second movable bolt into said second trench, departing from said second hole, and recovering said second carrying member to the initial position.

17. The ancillary fixture for assembling a touch display of claim 16, wherein said second movable bolt comprises:

a second sheath disposed in said second trench;

a second elastic member disposed in said second sheath; and a second pin passing through said second elastic member located between said second sheath and said second pin for supporting said second pin.

* * * * *